(12) United States Patent
Pitzer

(10) Patent No.: US 10,053,132 B2
(45) Date of Patent: Aug. 21, 2018

(54) MOTOR VEHICLE STEERING WHEEL HAVING A DISPLAY UNIT IN THE STEERING WHEEL RIM

(71) Applicant: Bayerische Motoren Werke Aktiengesellschaft, Munich (DE)

(72) Inventor: Franz Pitzer, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/426,315

(22) Filed: Feb. 7, 2017

(65) Prior Publication Data

US 2017/0144688 A1     May 25, 2017

Related U.S. Application Data

(63) Continuation of application No. PCT/EP2015/067428, filed on Jul. 29, 2015.

(30) Foreign Application Priority Data

Aug. 13, 2014   (DE) .................. 10 2014 216 105

(51) Int. Cl.
   *B60Q 1/00*     (2006.01)
   *B62D 1/04*     (2006.01)
   (Continued)

(52) U.S. Cl.
   CPC .............. *B62D 1/046* (2013.01); *B60Q 3/283* (2017.02); *B62D 15/021* (2013.01); *B62D 15/025* (2013.01); *G05D 1/0088* (2013.01)

(58) Field of Classification Search
   CPC .................................................. B62D 1/046
   (Continued)

(56) References Cited

U.S. PATENT DOCUMENTS 5,469,356 A  *  11/1995  Hawkins ............... G01C 21/26
                                                        318/591
5,835,870 A     11/1998  Kagawa
                         (Continued)

FOREIGN PATENT DOCUMENTS

DE     10 2007 060 347 A1     6/2008
DE     10 2009 059 670 A1     6/2011
                         (Continued)

OTHER PUBLICATIONS

German-language Search Report issued in counterpart German Application No. 10 2014 216 105.3 dated Apr. 14, 2015 with partial English translation (11 pages).

(Continued)

*Primary Examiner* — Daryl Pope
(74) *Attorney, Agent, or Firm* — Crowell & Moring LLP

(57) ABSTRACT

A motor vehicle steering wheel has a display unit which is provided in the steering wheel rim and gives the driver an indication on the vehicle steering angle in the manner of a scalar display. The display unit is active at least when the motor vehicle is in an autonomous or highly automated driving move in which the steering wheel does not move, not even when the vehicle negotiates curves. The display unit can operate in a slightly anticipatory manner so as to be able to give an indication on the vehicle steering angle to be set by a control system for the autonomous driving mode on a stretch of road that lies ahead and is visible to the driver. In certain boundary conditions, the display unit can display a vehicle steering angle that is too great or too small, depending on the traveling speed of the vehicle.

9 Claims, 1 Drawing Sheet

(51) Int. Cl.
*G05D 1/00* (2006.01)
*B62D 15/02* (2006.01)
*B60Q 3/283* (2017.01)

(58) Field of Classification Search
USPC .................................. 340/438, 425.5, 426.1
See application file for complete search history.

(56) References Cited

U.S. PATENT DOCUMENTS

| | | |
|---|---|---|
| 2008/0143505 A1 | 6/2008 | Maruyama et al. |
| 2008/0211651 A1 | 9/2008 | Beutnagel-Buchner et al. |
| 2009/0192677 A1* | 7/2009 | Cech .................. G01C 21/36 |
| | | 701/41 |
| 2011/0187518 A1 | 8/2011 | Strumolo et al. |
| 2014/0109719 A1 | 4/2014 | Lisseman et al. |
| 2014/0328077 A1 | 11/2014 | Tovar et al. |
| 2016/0052549 A1 | 2/2016 | Eichhorn |

FOREIGN PATENT DOCUMENTS

| | | |
|---|---|---|
| DE | 10 2010 051 939 A1 | 5/2012 |
| DE | 10 2011 112 134 A1 | 3/2013 |
| DE | 10 2013 208 206 A1 | 11/2014 |
| EP | 3 127 776 A1 | 2/2017 |

OTHER PUBLICATIONS

International Search Report (PCT/ISA/210) issued in PCT Application No. PCT/EP2015/067428 dated Jan. 28, 2016 with English translation (7 pages).
German-language Written Opinion (PCT/ISA/237) issued in PCT Application No. PCT/EP2015/067428 dated Jan. 28, 2016 (5 pages).

* cited by examiner

MOTOR VEHICLE STEERING WHEEL HAVING A DISPLAY UNIT IN THE STEERING WHEEL RIM

CROSS REFERENCE TO RELATED APPLICATIONS

This application is a continuation of PCT International Application No. PCT/EP2015/067428, filed Jul. 29, 2015, which claims priority under 35 U.S.C. § 119 from German Patent Application No. 10 2014 216 105.3, filed Aug. 13, 2014, the entire disclosures of which are herein expressly incorporated by reference.

BACKGROUND AND SUMMARY OF THE INVENTION

The invention relates to a steering wheel of a motor vehicle having a display unit that is disposed in the steering wheel rim and, in the manner of a scaled display, provides the driver of the vehicle with an indication of the vehicle steering angle. Alternately, the present invention can also be described by a method for displaying a variable related to the steering angle of a motor vehicle in the form of a scalar display on the rim of a steering wheel of the vehicle. With respect to the prior art, reference is made to DE 10 2011 112 134 as well as DE 10 2009 059 670 A1.

The basic principle of highly automated driving, also referred to as autonomous driving, where a two-track, not track-bound motor vehicle is operated in public road traffic solely by an electronics unit, is comprehensively known at least to those skilled in the art. Taking into account suitable current data from the surroundings of the vehicle, the vehicle is not only braked or accelerated, but also steered to at least follow the course of the road. Ideally, the steering wheel should be decoupled from the steering train by suitable modes of action and remain in its neutral position even when negotiating curves, which is to say, it should not rotate during automatic steering of the vehicle.

In this context, it is known from DE 10 2011 112 134 that an operating property, which also refers to an autonomous driving mode, is displayed to the driver of the vehicle via a light source disposed in the steering wheel rim. The DE 10 2009 059 670 A1 reference describes a steering wheel of an industrial vehicle via which the steering angle change speed is specified so that the current position of the steering wheel does not allow any conclusions as to the wheel steering angle, which is why said wheel steering angle is displayed via electroluminescent diodes on the steering wheel rim in the manner of a scalar display.

In particular, in a prolonged introductory phase of systems that facilitate autonomous driving (in the following, this will be the only term used, even for the so-called highly automated driving) in motor vehicles, in particular in sedans, it will be difficult for the drivers of such vehicles to blindly trust said systems to take correct action. In particular, during the state of autonomous driving when the steering wheel is stationary, a driver knows very little about the current steering angle of the vehicle; this is because he can derive said steering angle only from the movement of the vehicle, with said vehicle moving either on a track specified by the course of the road, or it can also, to a certain extent, deviate from the course of the road. Depending on the driving speed, the driver may also feel the vehicle steering angle as a result of the centrifugal force. For the sake of completeness, it should also be mentioned in this context that the term "vehicle steering angle" describes in the present case the angle between the longitudinal axis of the vehicle when driving straight ahead and the longitudinal axis of the vehicle when the vehicle negotiates curves; however, such a steering angle can also represent the so-called current "mean" steering angle of the steered vehicle wheels.

The object of the present invention is then to counteract the driver's uncertainty during autonomous driving mode, which was described in the preceding paragraph. The object of the invention is attained in accordance with embodiments of the invention.

According to the invention, when a motor vehicle moves autonomously or in a highly automated fashion, a variable (suitably) related to the steering angle (the vehicle steering angle or the mean steering angle of the steered wheels) is displayed to the driver in the manner of a scalar display on the rim of the vehicle's steering wheel, which steering wheel does not move when negotiating curvy roads. Thus, the driver receives useful and reassuring information about a correctly functioning steering system since the displayed steering angle variable is going to change during the vehicle's drive in correlation with other information that signals a steering movement of the vehicle to the driver. The present invention is described above in the form of a method, as well as a steering wheel device.

On a steering wheel according to the invention having a display that is provided in the steering wheel rim and that gives the driver of the vehicle an indication, in the manner of a scalar display, with respect to the vehicle steering angle, the display can be advantageously refined such that the display operates in a slightly anticipatory manner and therefore gives the driver an indication of the vehicle steering angle to be set by a control system for the autonomous driving mode on a stretch of road that lies ahead and is visible to the driver. The display is active at least when the motor vehicle is in the autonomous or highly automated driving mode in which the steering wheel does not move, not even when the vehicle negotiates curves. A method according to the invention can work accordingly, which is to say, the driver is effectively provided with a steering angle preview for a stretch of the road that lies ahead and is visible to the driver. This is possible in a simple manner because a control system for autonomous driving has all of the information required to initiate, in a timely manner, the actions required for the driving task coming up.

Furthermore, it may be provided that at least in certain boundary conditions, the display according to the invention displays the vehicle steering angle either too great or too small. In particular during fast driving on the autobahn, only curves with very low curvature have to be negotiated, which requires very low steering angles. So as to render such low steering angles or steering angle changes visible at all, they should be displayed in an exaggerated or enlarged fashion. On the other hand, for example when parking the vehicle and thus at very low driving speeds, the resulting steering angles are so high that they suitably should be displayed in a reduced fashion because otherwise, the quickly changing display could irritate the driver. According to the description above, the size or the intensity of the increase or decrease of the displayed vehicle steering angle therefore may depend on the driving speed of the vehicle.

As regards the design of the display as such, there are various design options; however, the preferred design is any type of scalar display such that a higher value to be displayed runs in the displayed form over a larger segment of the steering wheel rim than a smaller value to be displayed. It goes without saying that the steering direction should also be suitably displayed so that, for example proceeding from the highest top point of the steering wheel in neutral position, the scalar display travels to the right when negotiating a right curve, and to the left when negotiating a left curve. The current steering angle (or a lower or higher steering angle that would be required to display the current steering angle), can always be displayed by emphasizing in color or brightness the appropriate segment on the steering wheel rim to display in this way to the driver the steering movement on the steering wheel (which is actually not moving). Ideally, the display segment does not take up the complete width or depth of the rim, but rather requires only on a narrow ring on the steering wheel rim. Of the ring, only a respective relevant segment is emphasized in some manner. It goes without saying that the respective display can also be suitably prepared in an additional form, for example damped, with higher-frequency, quasi "nervous" portions of the steering angle being filtered out.

A display as described above, for example a display ring provided in some fashion on the steering wheel rim, on which according to the invention a variable related to the steering angle is represented visually in the manner of a scalar display, can also be used for additional displays for the driver. In particular in dangerous situations related to the steering task, the need for manually interfering can be pointed out to the driver; at the same time, he can be given recommendations for a favorable intervention, such as, for example with various colors, brightness, type and frequency of running patterns, and much more. Even when, during autonomous driving mode, it becomes necessary for the driver to take over the steering task, a request to that effect can be made via, or supported by, optical signals (such as blinking, movement patterns, etc.) of the aforementioned display ring.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
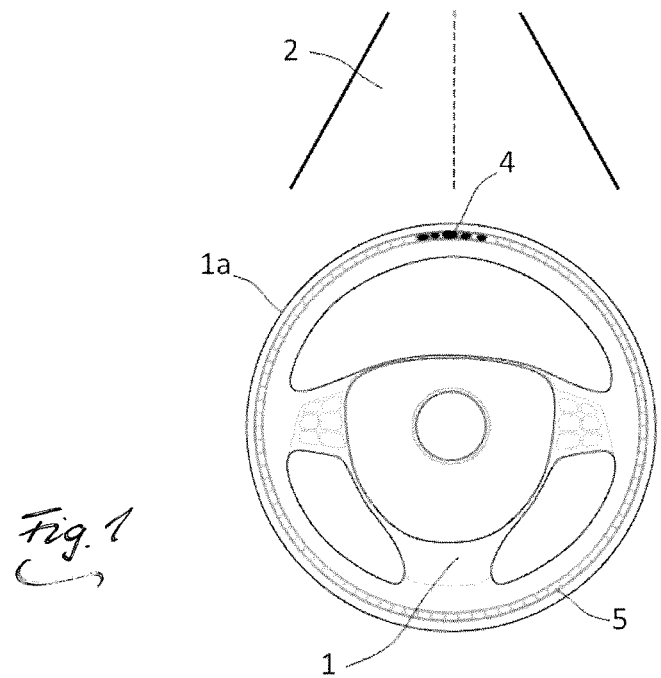
FIG. 1 is a schematic representation of a steering wheel according to an embodiment of the invention with a vehicle driving straight ahead.
Figure 2:
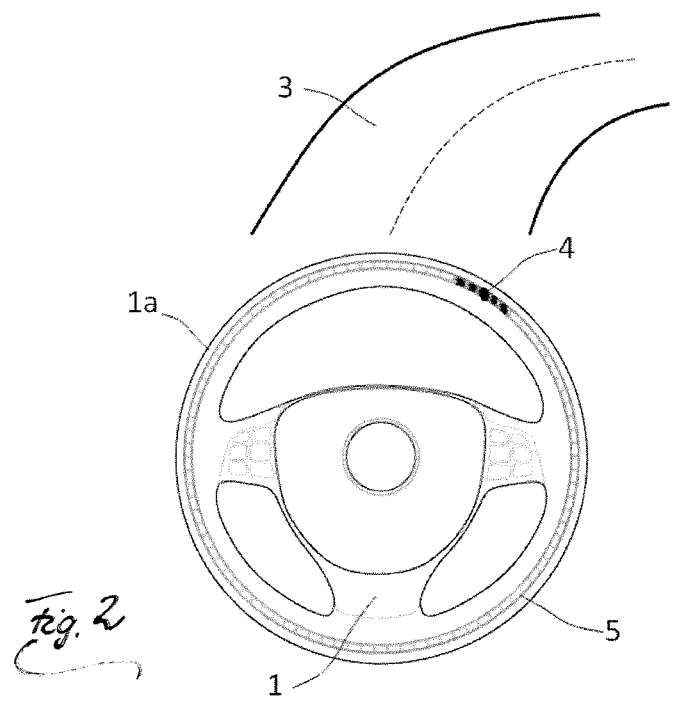
FIG. 2 is a schematic representation of the steering wheel of FIG. 1 with the vehicle negotiating a slight right turn.

In the enclosed representation of the figures, a steering wheel 1, which is labeled with the reference numeral 1, is shown twice, e.g. once at the top while the vehicle is driving straight ahead (FIG. 1), which is represented by the course of the track segment 2 ahead that is visible to the driver as usual above the steering wheel 1 (through the windshield), as well as at the bottom (FIG. 2) when the vehicle negotiates a slight right curve, which is shown analogously by the course of the track segment 3 that is visible to the driver. The reference numeral 4 always characterizes the display of the steering angle or the variable to be displayed in relation to the steering angle on the steering angle rim 1a, whereas the aforementioned display ring, on which the display 4 is visible, is characterized with the reference numeral 5. A comparison of the two figures shows that the steering wheel 1 itself is not moving, which is to say, the spokes of the steering wheel 1 make it clear that the steering wheel 1 has not moved between driving straight ahead (FIG. 1) and negotiating the slight right curve (FIG. 2) during autonomous driving mode. However, the display 4 on the display ring 5 did travel clockwise to the right by a certain measure. In the present case, the display 4 is comprised of a few segments illuminated in a specific color, the segments are part of the display ring 5 that is comprised of a great number of such illuminatable segments and extends over the entire steering wheel rim 1a.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering wheel of a motor vehicle, comprising:
a steering wheel rim arranged in a radially outermost portion of the steering wheel;
a display arranged in the steering wheel rim, the display being a scalar display that provides a driver of the vehicle with an indication of a vehicle steering angle, wherein the display is active at least when the motor vehicle moves in an autonomous or highly automated driving mode in which the steering wheel does not move even in an event of the motor vehicle negotiating a curve.

2. The steering wheel according to claim 1, wherein the display is operatively configured to provide the indication to the driver in a slightly anticipatory manner by providing the driver with the indication on the vehicle steering angle, which is to be set by a control system for the autonomous driving mode, on a stretch of road that lies ahead and is visible to the driver.

3. The steering wheel according to claim 2, wherein the display is operatively configured to, at least under certain boundary conditions, display the vehicle steering angle in a manner that is too great or too small relative to the display in other conditions.

4. The steering wheel according to claim 1, wherein the display is operatively configured to, at least under certain boundary conditions, display the vehicle steering angle in a manner that is too great or too small relative to the display in other conditions.

5. The steering wheel according to claim 3, wherein the too great or too small display of the vehicle steering angle is an exaggeration or a reduction, respectively, of the displayed vehicle steering angle depending on a driving speed of the motor vehicle.

6. A method for displaying a variable related to a steering angle of a motor vehicle, the method comprising the acts of:
moving the motor vehicle in an autonomous or highly automated driving mode in which a steering wheel of the motor vehicle does not rotate as the motor vehicle negotiates curves; and
displaying the variable related to the steering angle as a scalar display on a radially outermost portion of the steering wheel.

7. The method according to claim 6, wherein the act of displaying the variable is carried out in a slightly anticipatory manner by providing a driver an indication of the vehicle steering angle, which is to be set by a control system for the autonomous driving mode, on a stretch of road lying ahead and visible to the driver.

8. The method according to claim 6, wherein the displaying of the variable is carried out in an exaggerated or reduced manner under certain boundary conditions.

9. The method according to claim 8, wherein the displaying of the variable in the exaggerated or reduced manner depends on a driving speed of the vehicle.

* * * * *